June 28, 1960   K. R. McCLURE   2,942,908
SELF-LOCKING SHACKLE SEAL
Filed April 18, 1958
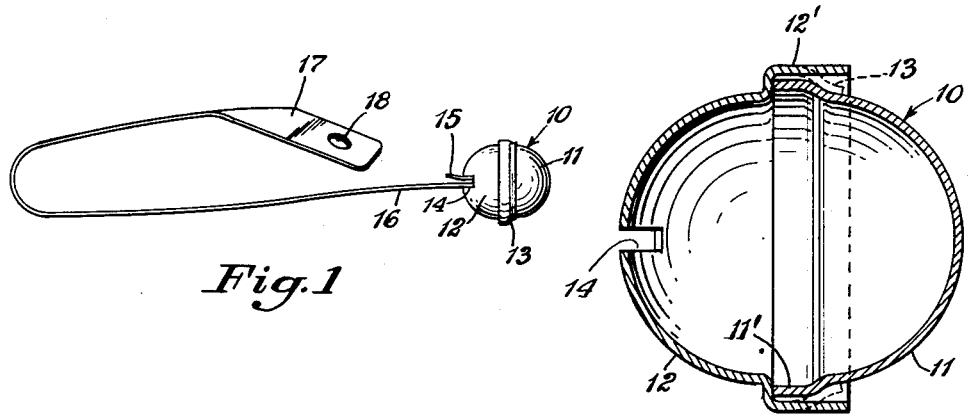
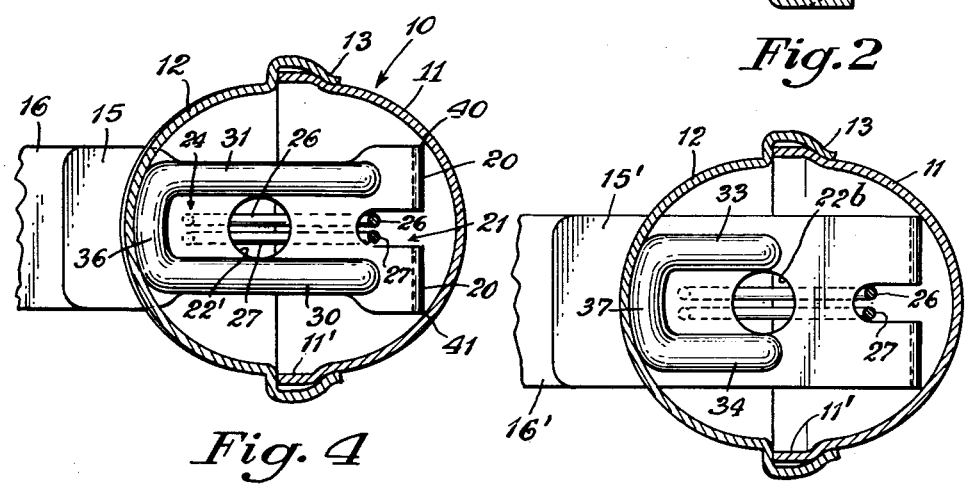
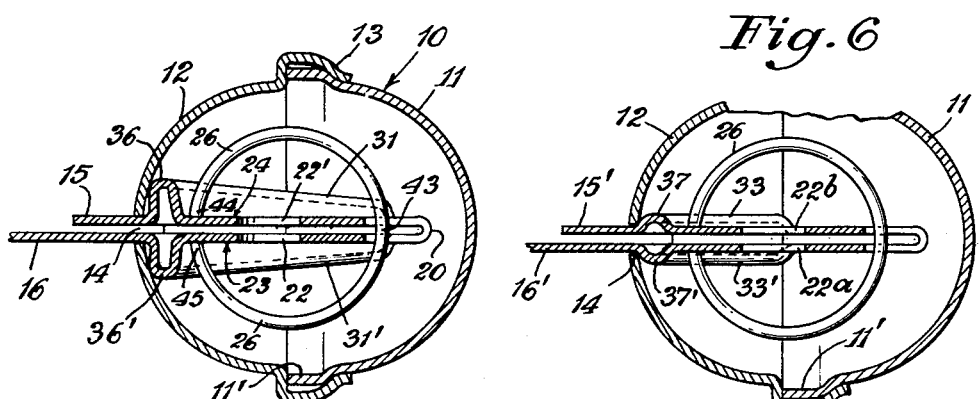
Inventor
Kenneth R. McClure
by W. Bartlett Jones
Attorney United States Patent Office 2,942,908
Patented June 28, 1960

2,942,908

SELF-LOCKING SHACKLE SEAL

Kenneth R. McClure, St. Charles Township, Kane County, Ill., assignor to Wallace J. Dickey, St. Charles Township, Kane County, Ill.

Filed Apr. 18, 1958, Ser. No. 729,333

8 Claims. (Cl. 292—324)

The present invention relates generally to self-locking shackle seals, better known as car seals, and in particular to an improved construction thereof.

Car seals are designed with two major objectives. A foremost objective is to provide a seal which is tamper-proof, that is, which cannot be unsealed by tampering and so repaired as to conceal the tampering. Another objective is economy in manufacture. Attempts to meet both objectives have resulted in a wide variety of seals over the course of time.

One of the effective structures for the self-locking mechanism is the type shown in Mackey No. 2,343,564 in which the insertion of the free end of a shackle strip into a casing wherein the other end is anchored, displaces a pair of opened spring split rings into a position where they close and lock the said inserted end against withdrawal. The locking structure is housed in a casing which commonly has a seal or joint subject to being opened by unlawful tampering, but practically impossible to repair for concealing the tampering. The present invention employs such a self-locking structure of the above-described type, but with improvements.

It is an object of the present invention to provide an improved seal having a structure which is tamper-proof to the extent that it is incapable of repair.

It is a particular object to provide a seal with a shackle firmly held within the casing against force to withdraw it.

Various other and ancillary objects and advantages of the invention will become apparent from the following description and explanation of the improved seal and the method of manufacture shown in the accompanying drawings in which:

Fig. 1 is a view of the completed seal ready for locking action.

Fig. 2 is an enlarged cross-section of the casing parts as positioned before closing the casing.

Fig. 3 is a cross-section similar to Fig. 2 with the locking mechanism in position.

Fig. 4 is a plan view of the locking mechanism as viewed within the casing, showing the rings and the casing in cross-section.

Figs. 5 and 6 are the views similar to Figs. 3 and 4 of a modified locking mechanism.

The invention is not to be considered as limited to and by the form illustrated in the drawings.

Fig. 1 shows the finished seal. It has a casing 10, preferably globular as made of two generally hemispherical parts 11 and 12 having originally nesting cylindrical bands 11' and 12' at the diametrical openings.

Part 12 has an elongated slot 14 of uniform width from which emerge two flat strips 15 and 16 of equal thickness with a space between them but slightly wider than their thickness freely to receive the remote end 17 of the strip 16 which end has a hole 18 therein for conventional use. In the well-known structure of this nature, the end 17 may be inserted into the slot between the strips 15 and 16 to push back conventional split-ring means to the point where they close into hole 18 when it is coincident with another opening later described. The projecting strip 15 is the end of the strip 16 which is doubled back on itself within the casing.

Fig. 2 is an enlarged view of the casing showing the parts 11 and 12 before the in-turned flange 13 (dotted line) is formed from the band portion 12'. Before the flange 13 is crimped into place, the free end 17 of the shackle strip 16 is threaded through the slot 14 as far as possible, being stopped by an obstruction integral with the shackle strip, which obstruction is located so that the short end 15 may also pass through the slot.

Heretofore, various means have been provided to serve as the said obstruction, and the present invention is an improvement not only providing said obstruction but serving to strengthen the shackle strip internally and also to form a limiting guideway for the open split rings.

Fig. 3 is a fragmentary cross-section showing the strip 16 passing through the slot 14, and the strip 15 also emerging. Inside the casing the two strips 15 and 16 are connected at the reverse fold 20. The two strips 20 have a recess 21 inwardly from the fold line 20 (see Fig. 4); and inwardly from the slot-region of the casing and inwardly beyond the recess there are registering holes 22 and 22' with the flat of each strip extending longitudinally away from opposite sides of the holes. The flat areas 23 and 24 are those on which the split ends of rings 26 and 27 normally reside and then slide in reaching the holes 22.

The material of at least one, and preferably both of the adjacent strip sections, has an upset ridge in a U-form with legs encompassing flat areas 23 or 24 and tangent to holes 22 thus to limit the region for lateral play of the rings and to guide them. The legs of the U are designated 30 and 31 as seen in Fig. 4, with the preferred opposite parts 30' and 31' of which only 31' is shown in Fig. 3. The U-legs define the lateral edges of the strips containing them, and in upsetting the strip it becomes narrowed as shown. The legs preferably extend beyond the holes 22 to the region of the recess 21, thereby giving greater strength and rigidity to the flat strip. As shown in Figs. 5 and 6, the legs 33 and 34 with or without legs 33' and 34' may be shorter thereby dispensing with such additional reinforcement between the holes 22 and recess 21.

In Figs. 3 and 4, the U-form has a base 36 with or without a like base 36' formed as an upstanding ridge or obstruction with at least a portion located at the interior wall of casing part 12 and preferably shaped according to said wall, thus to resist withdrawal force in the shackle.

Figs. 5 and 6 show modified shackle strips 16' and 15' with holes 22ᵃ and 22ᵇ respectively, and with U-ridges having said shorter legs 33 and 34 and corresponding U-bases 37 and 37' likewise to resist withdrawal force. The peripheral contour of the U-bases 36 and 37 is preferably rounded to conform to the interior curve of the casing thus to distribute any withdrawal force over the width of the slot and minimize danger of deforming the casing at the slot.

The longer legs of Figs. 2 and 3 are preferred, as well as is the duplication thereof in the two adjacent strips 15 and 16. Not only may there be force to withdraw the strips but attempts may be made to ram the parts inwardly against the rear wall of casing section 11, at which contact is normally made by the corners 40 and 41. Without said longer legs such ramming may result in bending or twisting of the strips in the region between the holes 22 and the fold 20.

The operation of the seal is not changed by the improved structure. When the free end 17 is inserted into the casing between the adjacent strips therein, its end strikes the rings at the region 43 in Fig. 3, forcing the rings outwardly of the recess 21 and moving the split ends 44—45 on the flats 23 and 24 toward the openings 22, which they reach when the hole 18 of the inserted end 17 is coincident with holes 22. Then, the rings close and lock the inserted end within the casing. After this locking, the obstruction formed by the base of a U resists attempts to withdraw the locked shackle.

It is to be understood that numerous changes and modifications in departure from the illustrated seal, are contemplated as falling within the scope of the invention as expressed in the appended claims.

I claim:

1. A shackle seal comprising a hollow casing having an elongated slot of uniform width opening into the casing, a metal shackle strip reversely folded within the casing and having two portions thereof emerging from the casing through only a portion of the width of the slot, one of said strip portions providing a shackle and having a free end adapted to enter the casing through the remaining width of the slot, said remaining width being substantially the thickness of said end freely to receive said end, the reversely folded portions of said strip within the casing having a recess inwardly from the fold for receiving split-ring means and having inwardly from said recess and inwardly from the region of the slot registering holes, resilient split-ring means normally having split ends held apart by and resting on said strip portions between said registering holes and said slot region when the diametrically opposite portion of the said ring means resides in said recess, at least one of said strip portions within the casing having an outwardly upset ridge from the normal plane of the strip in the form of a U with the legs of the U tangent to said holes and the base of the U-shaped in conformity with the contour of the interior wall of the casing adjacent the slot and located at said wall, said free end of the shackle having a hole inwardly from its terminal edge to register with the holes in the reversely folded portions within the casing for receiving the ring means in locking action.

2. A seal in accordance with claim 1 in which the legs of the upset U extend beyond the registering holes and to the region of the recess in the fold.

3. A seal in accordance with claim 1 in which the legs of the upset U constitute the lateral edges of the upset strip portion.

4. A shackle seal comprising a hollow casing having an elongated slot of uniform width opening into the casing, a metal shackle strip reversely folded within the casing and having two portions thereof emerging from the casing through only a portion of the width of the slot, one of said strip portions providing a shackle and having a free end adapted to enter the casing through the remaining width of the slot, said remaining width being substantially the thickness of said end freely to receive said end, the reversely folded portions of said strip within the casing having a recess inwardly from the fold for receiving split-ring means and having inwardly from said recess and inwardly from the region of the slot registering holes, resilient split-ring means normally having split ends held apart by and resting on said strip portions between said registering holes and said slot region when the diametrically opposite portion of said ring means resides in said recess, the two strip portions within the casing having each an outwardly upset ridge from the normal plane of the strip in the form of a U with the legs of the U tangent to said holes and the base of the U-shaped in conformity with the contour of the interior wall of the casing adjacent the slot and located at said wall, said free end of the shackle having a hole inwardly from its terminal edge to register with the holes in the reversely folded portions within the casing for receiving the ring means in locking action.

5. A seal in accordance with claim 4 in which the legs of the upset U's extend beyond the registering holes and to the region of the recess in the fold.

6. A seal in accordance with claim 4 in which the legs of the upset U's constitute the lateral edges of the upset strip portions.

7. A shackle seal comprising a hollow casing having an elongated slot of uniform width opening into the casing, a metal shackle strip reversely folded within the casing and having two portions thereof emerging from the casing through only a portion of the width of the slot, one of said strip portions providing a shackle and having a free end adapted to enter the casing through the remaining width of the slot, said remaining width being substantially the thickness of said end freely to receive said end, the reversely folded portions of said strip within the casing having a recess inwardly from the fold for receiving split-ring means and having inwardly from said recess and inwardly from the region of the slot registering holes, resilient split ring means normally having split ends held apart by and resting on said strip portions between said registering holes and said slot region when the diametrically opposite portion of said ring means resides in said recess, at least one of said strip portions within the casing having an outwardly upset ridge from the normal plane of the strip in the form of a U with the legs of the U tangent to said holes and the base of the U having at least a portion in contact with the interior wall of the casing adjacent the slot, said free end of the strip having a hole inwardly from its terminal edge to register with the holes in the reversely folded portions within the casing for receiving the ring means in locking action.

8. A seal in accordance with claim 7 in which both strip portions within the casing have said form of U.

References Cited in the file of this patent

UNITED STATES PATENTS

| | | |
|---|---|---|
| 629,939 | Tyden | Aug. 1, 1899 |
| 1,536,822 | Dietze | May 5, 1925 |
| 2,343,564 | Mackey | Mar. 7, 1944 |